US009921937B2

(12) United States Patent
Seto

(10) Patent No.: US 9,921,937 B2
(45) Date of Patent: Mar. 20, 2018

(54) BEHAVIOR CLUSTERING ANALYSIS AND ALERTING SYSTEM FOR COMPUTER APPLICATIONS

(71) Applicant: Microsoft Technology Licensing, LLC, Redmond, WA (US)

(72) Inventor: Tetsuo Seto, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 458 days.

(21) Appl. No.: 14/596,159

(22) Filed: Jan. 13, 2015

(65) Prior Publication Data
US 2015/0205692 A1  Jul. 23, 2015

Related U.S. Application Data

(60) Provisional application No. 61/930,929, filed on Jan. 23, 2014.

(51) Int. Cl.
  *G06F 11/30* (2006.01)
  *G06F 11/34* (2006.01)
  *G06F 11/00* (2006.01)

(52) U.S. Cl.
  CPC ........ *G06F 11/3452* (2013.01); *G06F 11/008* (2013.01)

(58) Field of Classification Search
  CPC . G06F 11/008; G06F 11/3452; G06F 11/3051
  USPC .......... 702/182, 183, 186; 703/22; 709/223, 709/224; 714/45; 382/128
  See application file for complete search history.

(56) References Cited

U.S. PATENT DOCUMENTS

| | | | |
|---|---|---|---|
| 7,720,955 B1 | 5/2010 | Kelly et al. | |
| 2008/0033991 A1 | 2/2008 | Basak et al. | |
| 2009/0249129 A1 | 10/2009 | Femia | |
| 2009/0271511 A1 | 10/2009 | Peracha | |
| 2012/0197626 A1 | 8/2012 | Kejariwal et al. | |
| 2013/0083979 A1 | 4/2013 | Vilsmeier | |
| 2014/0317454 A1* | 10/2014 | Gataullin | G06F 11/3636 714/45 |
| 2015/0205690 A1 | 7/2015 | Seto et al. | |

(Continued)

FOREIGN PATENT DOCUMENTS

EP  0814413  12/1997
WO  WO2013072232  5/2013

OTHER PUBLICATIONS

International Search Report issued in PCT Application No. PCT/IB2014/060241 dated Dec. 15, 2014.

(Continued)

*Primary Examiner* — John H Le
(74) *Attorney, Agent, or Firm* — Workman Nydegger

(57) ABSTRACT

Dimensionality reduction, such as principal component analysis, may be used at least in part to generate a model of time series observations of a computer application. The model may be applied to current and predicted observations. Outliers may be identified from current or predicted observations by analyzing those observations against the model, and statistically relevant outliers may generate alerts or corrective or other action to be taken. The outliers may be analyzed by searching for similar outliers that may have been previously observed, and predicting any future events based on similar observations of the past.

18 Claims, 12 Drawing Sheets

(56) References Cited

U.S. PATENT DOCUMENTS

2015/0205691 A1   7/2015  Seto et al.
2015/0205693 A1   7/2015  Seto et al.

OTHER PUBLICATIONS

Ahmed, Aboamama Atahar, Visualization Pipeline for Medical Datasets on Grid Computing Environment, 2007 IEEE, pp. 567-575.
Office Action dated Apr. 28, 2017 cited in U.S. Appl. No. 14/596,151.
Yang, et al., "A pattern fusion model for multi-step-ahead CPU load prediction", In Journal of the Systems and Software vol. 86, Issue 5, Dec. 27, 2012, 10 pages.
"Search Report Issued in European Patent Application No. 14879810.1", Dated Sep. 27, 2017, 9 pages.
Esling, et al., "Time-series data mining", In Proceedings of the ACM Computing Surveys, vol. 45, Issue 1, Nov. 2012, 34 pages.

\* cited by examiner

BEHAVIOR CLUSTERING ANALYSIS AND ALERTING SYSTEM FOR COMPUTER APPLICATIONS

CROSS-REFERENCE TO RELATED APPLICATION

This Application claims the benefit of Provisional Application No. 61/930,929, filed Jan. 23, 2014, the entire disclosure of which is hereby incorporated by reference.

BACKGROUND

Computer monitoring is a wide field that may encompass any type of status reporting, alerting, or other management tools that may help maintain production computer systems. Computer monitoring may include hardware status and performance, network monitoring, software performance analysis, and many other components.

Conventional monitoring systems may evaluate real time or near-real time data and compare those data against thresholds, limits, or other metrics to determine whether an error or alert condition may exist. When an alert is triggered, some communication may be made to a human administrator who may take corrective action. Such systems tend to be reactive and able to detect when a problem has already occurred.

SUMMARY

A computer monitoring system may predict near term and long term performance by comparing a segment of current time series data with previously observed time series to find matching segments. From a matching segment, a prediction of performance may be made by examining later observations in the time series. Each time series element may include a large number of parameters, and one mechanism for comparing segments may be treating the elements as multi-dimensional vectors and using cosine similarity for finding significant matches. A deployment mechanism may store time series segments in a searchable database, and search the database with a newly observed time series segment for matches.

A monitoring system may compare currently observed time series segments to previously identified time series segments that may be precursors to an event. The event may be predicted when a correlation is observed between the time series segments. An event may be identified by a human observer who may identify and classify the event. In some cases, an event may be identified by observing an anomalous behavior and automatically identifying the behavior. The monitoring system may aggregate observed time series from multiple runs of the same application on the same or different execution platform, similar applications on the same or different execution platforms, similar or different users, or any other application on the same or different execution platforms. The identified events may be organized as a set of events that may be applied to new applications to predict events based on observations of other applications.

Dimensionality reduction, such as principal component analysis, may be performed against a time series of performance observations for a computer application. A visual representation of the results may be displayed in one, two, or three dimensions, and often show clusters of operational behavior. The representation may be animated to show a sequence of observations and how the behavior of an application may change from one cluster of operation to another. The representation may be further applied to show both a historical view of the observations and new observations. The time series may contain performance and operational data, as well as metadata observed from a computer application.

Dimensionality reduction, such as principal component analysis, may be used at least in part to generate a model of time series observations of a computer application. The model may be applied to current and predicted observations. Outliers may be identified from current or predicted observations by analyzing those observations against the model, and statistically relevant outliers may generate alerts or corrective or other action to be taken. The outliers may be analyzed by searching for similar outliers that may have been previously observed, and predicting any future events based on similar observations of the past.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
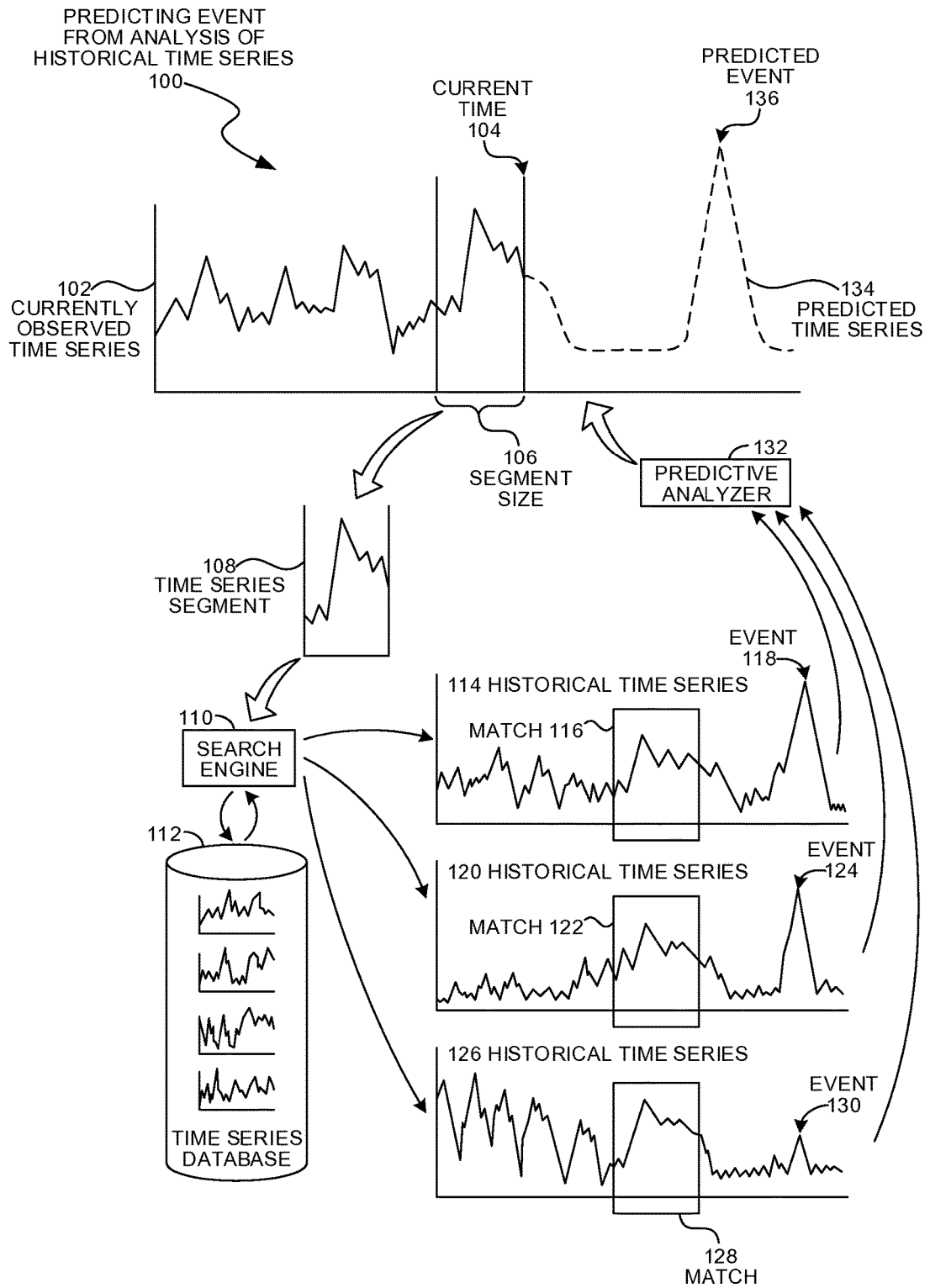
FIG. 1 is a diagram illustration of an embodiment showing a method for predicting events from analysis of historical time series.

Predictive Monitoring System Using a Search of Historical Observations.

A computer monitoring system may make statistically valid predictions of an application's behavior from a searchable database of previous observations. The observations may contain performance and operational observations which may be in the form of time series. Predictions may be made by selecting a current observation, then searching for a matching observation in a database of observations, finding a match, and looking for an event or other anomaly downstream from the matching historical observation.

The predictions may be merely performance or operational estimates or may identify events or anomalies that may be interesting. The performance or operational estimates may predict the observations that may be observed in the future. Such predictions may be displayed in various visualizations, used for load management, or for other uses. Predicted events or anomalies may be used to cause corrective action to be taken prior to an event.

A database of observations may include time series data, where each observation may be part of a series of observations. The observations may include operational and performance data for an application. Operational data may include items like the number of times a function may have been called or an operation may have been performed. Performance data may include items such as the amount of memory or other resource consumed or the response time to an input.

The observations may reflect the operations of an application or device as a whole, where the inputs to the application or device and its response to those inputs may be observed and stored. In some cases, the observations may include more fine grained view of an application or device, where individual functions or operations within the application or device may be observed. In still other cases, a single observation may reflect the operations and performance of a group of devices, which may be multiple homogeneous or heterogeneous devices.

The observations stored in a database may be aggregations of individual observations. For example, the database may contain aggregated observations for a specific time interval, such as the number, average, median, or other summary of observations taken over a period of time. The time period may be any interval, from nanoseconds, milliseconds, microseconds, seconds, minutes, hours, to days or longer.

The observations may be treated as a vector of parameters. The vector may have many parameters, and some cases may have three, five, ten, or even hundreds of observed parameters per observation. The parameter set may be different from one set of observations to another, and from one observation to another. In such cases, the database may be a sparsely populated database having many parameters for each observation on the time series. Comparisons between an observed time series and historical observations may be made using cosine similarity or other mathematical comparison.

The time series database may include observations from one or many devices. The database may include historical observations from the same application on the same execution platform, as well as the same application on different execution platforms and similar or different applications on the same or different execution platforms. Such observations may be searched to identify similar sets of observations that may have some predictive value.

Predictions may be made from observations of other applications or devices. In many cases, similar behavior between two different execution platforms or applications may still give a meaningful prediction, even though there may be differences between the systems. Such similarities may allow unfamiliar or systems with little historical data to still have meaningful and useful predictions made. In some cases, a database of many disparate and dissimilar applications, hardware platforms, software configurations, or other components may provide meaningful predictions of behavior of a previously unknown system.

Event Prediction Using Historical Time Series Observations of a Computer Application.

Predictions may be generated by searching a time series database to find similar historical time series segments that may be similar to a currently observed time series segment. From a selected historical time series, an expected set of performance results may be estimated from historical data. In many cases, a plurality of results may be combined to yield a predicted set of performance results. The predictions may be in the form of events that may be likely to occur. In many cases, an event may be something for which some action may be taken, such as an unwanted failure for example.

The prediction mechanism may take a currently observed time series segment and search for similar segments in a database of historical or observed time series. A search engine may return a set of similar observed time series, and in many cases, the search engine may include a numerical value of correlation or similarity.

For each similar observed time series, an analysis engine may generate predictions based on downstream observations in the database, as well as display an application's behavior after similarly observed time series. The downstream observations may include events and historical performance data. The observations may be combined and weighted in part by a correlation value to generate a prediction.

A prediction system may have a tracer or other data collection mechanism which may collect current observations. The current observations may be passed to a search engine, which may attempt to find similar time series segments in a database of historical observations. An analysis engine may analyze the search results to determine the predicted results. When certain events are identified, alerts or other responsive action may be triggered.

Some systems may use a time series segment to search within the historical data. The time series segment may be a sequence of observations. In some cases, the sequence may be two, three, or more observations. The sequence may be five, ten, twenty, or a hundred or more observations. As the number of observations grows, the system may have stronger correlations and more meaningful results, but may have a longer delay from the first observation to the predicted results.

A prediction system may perform searches against a historical database on an ongoing basis. Such systems may continually collect observations and send sequences of observations to a search and analysis system. The historical database may contain data from the same or different applications, as well as data collected from the same or different users and execution environments.

An event prediction system may identify an event in historical data, then identify time series sequences that lead up to the event. The identified time series sequences may be compared against currently observed time series segments to determine whether an event may occur.

The event prediction system may have automatic or manual event identification. A manual event identification may have a user interface where a user may identify an event. Once an event is identified, an analysis engine may identify precursor time series sequences that may have preceded the event. In an automatic event identification system, an event may be automatically detected by analyzing historical data, then passed to the analysis engine.

Precursor time series observations may be stored in an event database and compared to recently observed time series to identify imminent events. Such a system may consume less processing overhead than a system where an entire historical database may be searched for matches.

Visualization of Behavior Clustering of Computer Applications.

Computer application behavior may be visualized through principal component analysis or other dimensional reduction of performance observations. Principal component analysis or other dimensionality reduction analysis may generate clusters of application behaviors. These clusters may be displayed in a visualization. The visualization may be animated to show the sequence of observations over time. In some cases, color, shading, or other visual enhancement may be applied to show recent observations or even predicted observations.

Dimensionality reduction may be a general set of mechanisms that may assist in interpreting and understanding high dimensional data. Principal component analysis may be a statistical procedure that may use orthogonal transformation to convert a set of possibly correlated variables into a set of linearly uncorrelated and orthogonal variables called principal components. The first principal component may have the largest possible variance. Other dimensionality reduction mechanisms may include nonlinear and linear dimensionality reduction mechanisms.

Dimensionality reduction analysis may be performed on a set of time series observations of a computer application's performance. The time series may include parameters for individual functions, application programming interface calls, library components, network calls, memory operations, and many other observations. In many cases, the time series data may also include performance metrics, such as processing time, memory latency, memory consumption, peripheral operations, and other information. Each of the time series observations may be treated as a vector with many parameters, sometimes as many as ten, twenty, or even a hundred or more parameters.

The term "dimensionality reduction" may refer to any transformation of multi-parameter data into a list of components, and principal component analysis is a subset of such transformations. Dimensionality reduction analysis is a general term meant to incorporate many different algorithms. Other transformations within the realm of principal component analysis include Karhunen-Loeve transform, Hotelling transform, proper orthogonal decomposition, singular value decomposition, eigenvalue decomposition, factor analysis, Eckart-Young theorem, Schmidt-Misrky theorem, empirical orthogonal functions, empirical eigenfunction decomposition, empirical component analysis, quasiharmonic modes, spectral decomposition, empirical modal analysis, factor analysis, canonical correlation analysis, and other variations. Some transformations may be more complex than other transformations, yet all are considered under the blanket term "dimensionality reduction".

A system for analyzing and displaying observations using dimensionality reduction analysis may collect observations about an executing computer application, process the data into time series vectors, analyze the dataset into principal components to create a transformation function, then render a visualization of the data as transformed by the transformation function. The transformation function may be computed using historical data and then used to display new observations.

The transformation function may be re-computed periodically in some systems. When an application's behavior changes from one mode to the next, a transformation function that may apply to one mode of operation may not fully represent the application's behavior in the second mode. Such may be the case for a line of business application that may be very active during the business day but may enter into a backup or maintenance mode at night. During the day, the application may behave much differently than during the night, and the transformation function may change as well.

A complete transformation function may be generated by recomputing a transformation function over time and detecting the degree of changes in the function. As additional data are added to a time series and a dimensionality reduction analysis transformation is recomputed, the transformation may converge to a single transformation function that may represent all of the observations.

A visualization may be rendered from a dimensionality reduction analysis transformation. Once the transformation is computed, individual time series observations may be transformed into a one, two, or three dimensional plot of the observation as transformed by the transformation. As each observation is plotted as a point, clusters of observations may become visible in the plot.

The degree of clustering of observations of a computer application may be affected by the time period between observations. As the time period between observations becomes larger, the definition of the clusters may become less well defined, especially when the time series observations may be summaries of data collected during a time interval.

In such an example, a tracer may observe behavior of an application and may aggregate the observations every time period. The aggregated observations may include a number of executions of a function and the total processor time allocated for the function. The data may not include the processor time for each individual instance of the function, but may only include the sum of all processor time allocated to the function.

Behavior Clustering Analysis and Alerting System for Computer Applications.

Dimensionality reduction analysis transformation functions may be used as an alerting mechanism for monitoring computer applications. A dimensionality reduction analysis transformation function may define the modes in which an application may operate during 'normal' operations, and newly gathered observations that deviate from the 'normal' operations may be statistically significant indicators that the computer application may be behaving in an anomalous fashion.

A dimensionality reduction analysis transformation may be used as a machine learning technique to train an alerting system. A set of observations that define a baseline behavior of a computer application may be used to generate a dimensionality reduction analysis transformation. The transformation may be applied to the original set of observations to create a set of clusters of observations.

A newly received observation may be compared to the baseline observations by transforming the new observation and comparing it to previous observations. One such method of comparison may be cosine similarity, where the cosine similarity between the transformed observation and the nearest previous observation may be determined.

A newly received observation may be analyzed by applying the dimensionality reduction analysis transformation, then comparing the transformed observation to any clusters of previously observed behavior. When the new observation is near or within a cluster of previously observed behavior, the new observation may be considered routine. When the new observation is outside a previously observed cluster, the new observation may indicate an anomaly. In such an example, the observation may be compared to clusters to find the nearest cluster, then the distance to the center of the cluster may be determined.

The previous two examples are merely two mechanisms by which dimensionality reduction analysis may be used to generate alerts for newly received observations. Other mechanisms may also be used.

A system for alerting may have a lightweight analysis system that may receive a predefined dimensionality reduction analysis transformation and may apply the transformation to observations as those observations are made. Such a system may or may not also include analysis to determine whether or not and alert may be generated from the transformed observation. In some cases, a lightweight tracer operating on a monitored device may compute the transformed observation and transmit the transformed observation to another device for analysis.

Throughout this specification and claims, the term "component" is used to define a group of reusable code that may be incorporated into an application. A component may be known as a 'module', 'library', 'subroutine', or some other notion. For the purposes of this specification and claims, these terms are considered synonymous.

The "component" may be code that is arranged in a way that multiple applications may access the code, even though the applications may have no connection with each other. In general, a "component" may be code that is configured to be reused. In some cases, a component may be reused within the scope of a large application, while in other cases, the component may be shared to other application developers who may use the component in disparate and unconnected applications.

Many programming languages and paradigms have a notion of a "component" or library, where the component may have a defined interface through which an application may invoke and use the component. Some paradigms may allow a programmer to incorporate a component in a static manner, such that the component code does not further change after the application is written and deployed. Some paradigms may allow for dynamic libraries, which may be loaded and invoked at runtime or even after execution has begun. The dynamic libraries may be updated and changed after the application may have been distributed, yet the manner of invoking the libraries or components may remain the same.

Components may be distributed in source code, intermediate code, executable code, or in some other form. In some cases, components may be services that may be invoked through an application programming interface.

Throughout this specification and claims, the term "component" may be applied to a single reusable function. Such a function may be distributed as part of a library, module, or other set of code, and may reflect the smallest element of reusable code that may be distributed. A single "component" as referenced in this specification and claims may be an individual application programming interface call or callable subroutine or function, as well as a module, library, or other aggregation of multiple callable functions, application programming interface calls, or other smaller elements.

Throughout this specification and claims, the terms "profiler", "tracer", and "instrumentation" are used interchangeably. These terms refer to any mechanism that may collect data when an application is executed. In a classic definition, "instrumentation" may refer to stubs, hooks, or other data collection mechanisms that may be inserted into executable code and thereby change the executable code, whereas "profiler" or "tracer" may classically refer to data collection mechanisms that may not change the executable code. The use of any of these terms and their derivatives may implicate or imply the other. For example, data collection using a "tracer" may be performed using non-contact data collection in the classic sense of a "tracer" as well as data collection using the classic definition of "instrumentation" where the executable code may be changed. Similarly, data collected through "instrumentation" may include data collection using non-contact data collection mechanisms.

Further, data collected through "profiling", "tracing", and "instrumentation" may include any type of data that may be collected, including performance related data such as processing times, throughput, performance counters, and the like. The collected data may include function names, parameters passed, memory object names and contents, messages passed, message contents, registry settings, register contents, error flags, interrupts, or any other parameter or other collectable data regarding an application being traced. The collected data may also include cache misses, garbage collection operations, memory allocation calls, page misses, and other parameters.

Throughout this specification and claims, the term "execution environment" may be used to refer to any type of supporting software used to execute an application. An example of an execution environment is an operating system. In some illustrations, an "execution environment" may be shown separately from an operating system. This may be to illustrate a virtual machine, such as a process virtual machine, that provides various support functions for an application. In other embodiments, a virtual machine may be a system virtual machine that may include its own internal operating system and may simulate an entire computer system. Throughout this specification and claims, the term "execution environment" includes operating systems and other systems that may or may not have readily identifiable "virtual machines" or other supporting software.

Throughout this specification and claims, the term "application" is used to refer to any combination of software and hardware products that may perform a desired function. In some cases, an application may be a single software program that operates with a hardware platform. Some applications may use multiple software components, each of which may be written in a different language or may execute within different hardware or software execution environments. In some cases, such applications may be dispersed across multiple devices and may use software and hardware components that may be connected by a network or other communications system.

Throughout this specification, like reference numbers signify the same elements throughout the description of the figures.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors, which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is an illustration of an embodiment 100 showing a process for predicting events from analysis of historical time series. The process may use a search engine to attempt to find historical occurrences of a recent time series segment, then may analyze the historical time series to make a prediction of a future performance.

The time series in the example of embodiment 100 are shown as graphs representing a single parameter that may vary over time. In practice, the time series may be tracer output that may reflect multiple parameters that may be captured while a computer application executes. As such, the time series at each time interval may contain a vector of many parameters. A single parameter is illustrated in embodiment 100 for illustration, but the reader would understand that each time series may have many parameters.

A tracer may generate performance metrics that may be captured at each time interval. The performance metrics may include any measurement that may be made while an application executes. Such measurements may include resource usage, such as memory, processor, network, peripheral, or other resource consumed by an application. The measurements may include counts or other measures of components of an application, such as measuring the number of times a function is called or the amount of data processed by a routine. The measurements may include hardware or other software status or performance information, from physical temperature, power consumption, fan speed, to garbage collection measurements, cache misses, or other measurements.

The tracer may gather performance and other information by monitoring the environment in which an application executes. In such cases, the tracer may measure resource consumption of an application, as well as input and output data and other parameters. In such embodiments, a tracer may be part of an operating system or execution environment.

The tracer may gather information by instrumenting an application. In such cases, instrumentation may be added to an application to gather information at various points in the application. The points may be functions, subroutines, decision point, input or output points, peripheral interfaces, application programming interfaces, or other interfaces or locations within the application. Some tracers may automatically insert, wrap, monkey patch, or otherwise insert themselves into the application. Other tracers may interact with manually placed data collection points within an application.

A tracer may gather information regarding the data processed by an application. For example, some tracers may take measurements of incoming or outgoing data, which may include the size, type, or other descriptor of data. Some tracers may inspect data passed to, from, or within an application and may capture those data values as part of the data collection process.

Tracer data may include metadata that may be constant or may have little change over a particular execution run. Such metadata may include descriptors of a hardware platform, software components, or other metadata that may apply to a time series over multiple intervals. Such metadata may be included in each time series interval or may be collected once and applied to data associated with each time series interval.

The vector of information at each time series interval may contain 20, 50, 100, 500, or more parameters. As such, the multi-parameter vectors may represent the performance, state, or other information about an application for the time series interval. Such a time series dataset may be represented as a sparsely or fully populated matrix of observations.

The process of embodiment 100 may begin with a currently observed time series 102. The time series 102 may be the observations gathered by a tracer executing a first application. The current time 104 may be illustrated, along with a time series segment defined by a segment size 106. A time series segment 108 may be extracted from the current time series 102.

A search engine 110 may search for the time series segment 108 in a time series database 112. The time series database 112 may store historical observations of computer applications. The database 112 may include time series gathered from previous execution runs of the same application or from different applications. The database 112 may include data gathered on the same or different hardware platforms, and data gathered with the same or different software components.

The results of a search by the search engine 110 may yield multiple historical time series 114, 120, and 126. These historical time series may contain portions that may be similar to the time series segment 108. The historical time series 114 may have a matching segment 116, as well as an event 118 that may occur after the matching segment 116. Historical time series 120 may also have a matching segment 122 and a subsequent event 124. Historical time series 126 may have a matching segment 128 and an event 130.

A predictive analyzer 132 may generate a predicted time series 134 and predicted event 136 based on the various historical time series 114, 120, and 126. The predicted time series 134 and predicted event 136 may be generated by applying a weighting factor to each time series based on the similarity of the matching time segment to the time series segment 108. In many cases, a numerical similarity constant may be calculated between the time series.

The process of embodiment 100 may be a mechanism to predict behavior of a computer application by comparing current performance to previously observed behavior. In some cases, the prediction may be made based on observations of the same application operating on similar hardware. In other cases, the predication may be made at least in part based on observations of different applications on the same or different hardware. Such a system may make statistically relevant predictions based on the behavior of other computer systems. In many cases, such a database may contain data captured from previous versions of an application, and predictions may thereby be influenced by similar versions of the same application.

Predictions based on other computer's behavior with other applications may be useful to predict behavior with new applications, newly changed applications, new hardware platforms, or other situations where historical data for the identical configuration may not be available. Such a system may leverage the knowledge gained from many different computer systems to help predict various behavior or events.

Predicted events may be useful, for example, to alert a user of an impending problem or issue. Such a prediction may help a computer administrator when deploying line-of-business applications or other systems where downtime or service degradation may be unwanted or harmful.

The various events in the time series may be any type of event that a user may wish to track. In many cases, such events may be problems that users may wish to avoid. Some such events may include slight or major degradation of service, catastrophic failures, security breaches, or other unwanted events. In some cases, such events may be desirable events that may trigger other operations. In the examples of embodiment 100, the indicated events are illustrated as spikes or increases in the observed data. This is for illustration purposes, as some events may or may not be reflected in the increase or decrease of an observed parameter.

Figure 2:
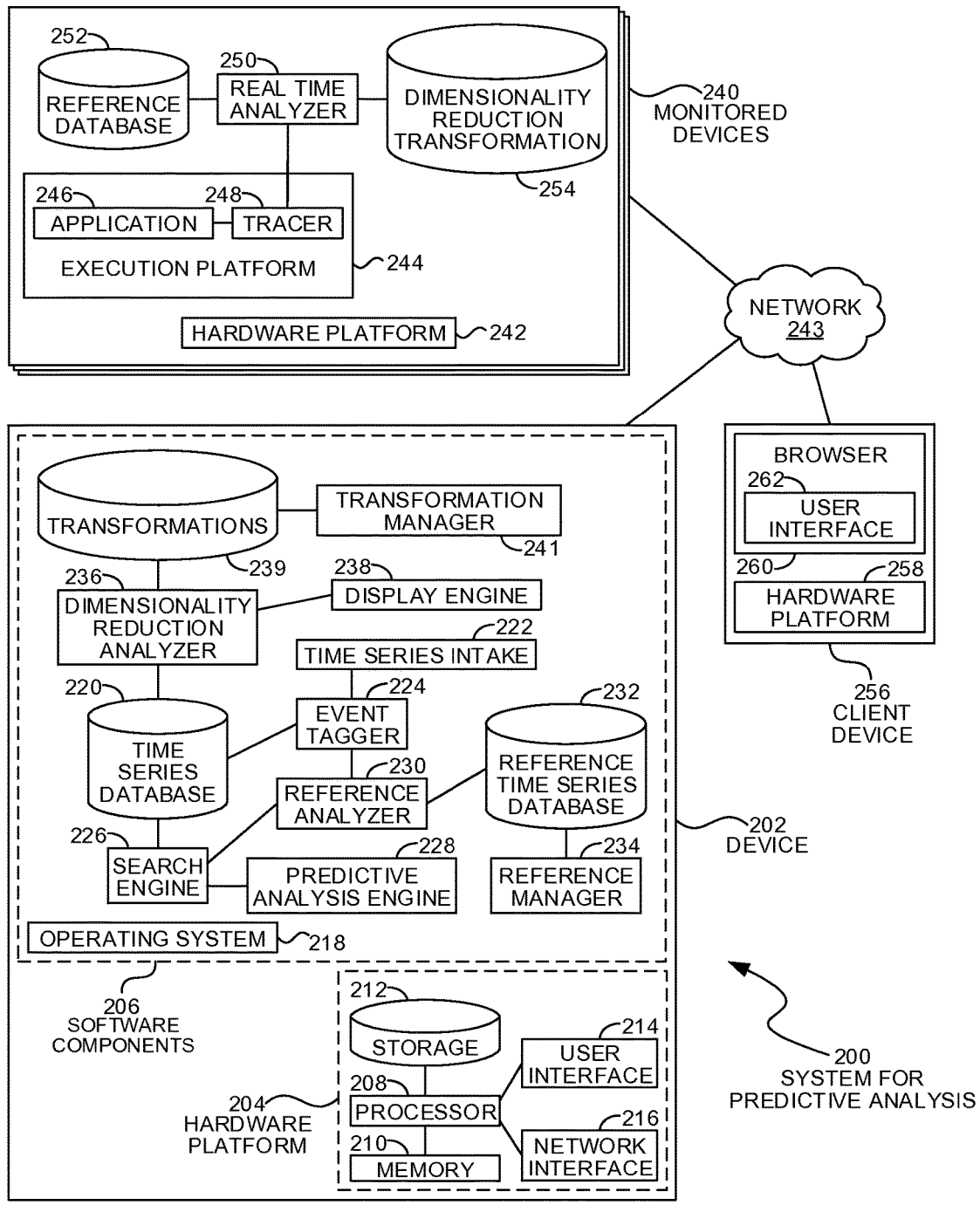
FIG. 2 is a diagram illustration of an embodiment showing a network environment with devices that may predict performance and events in a traced application.

FIG. 2 is a diagram of an embodiment 200 showing components that may collect and process tracer data while an application executes. The components are illustrated as being on different hardware platforms as merely one example topology.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components 206. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device. In some embodiments, the device 202 may be implemented on a cluster of computing devices, which may be a group of physical or virtual machines.

The hardware platform 204 may include one or more processors 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

One or more monitored devices 240 may be connected over a network 243 to the device 202. The monitored devices 240 may collect the raw tracer data, which may be transmitted to the device 202. In some cases, the monitored devices 240 may perform some analysis that may detect anomalies, as well as preprocessing or other analysis of tracer data.

The software components 206 of the device 202 may include an operating system 218 on which various software components and services may operate.

The device 202 may store and analyze tracer data that may be gathered by a tracer 248 on the monitored device 240. The device 202 may have a time series database 220 which may store time series data gathered from monitoring various devices.

The time series database 220 may be used in multiple ways to predict behavior and events for an application being executed. One method is described in embodiment 100, where a current time series segment is submitted to a search engine. The search results may be analyzed to predict future behavior as well as to predict possible future events. Such a method may be computationally expensive in some situations, yet may be capable of predicting general behavior in addition to predefined events.

Another method may be to analyze precursors to a given event and to create representative time series segments. A real time analyzer may compare pre-identified precursor time segments to current observations to determine the likelihood of an event. Such a method may be less computationally expensive as the first method in real time, but more offline analysis may be performed.

A third method may use dimensionality reduction analysis to decompose multivariate time series data into a transformation function, which may be applied to the available dataset. The transformation function may be applied to current observations, then a comparison may be made between the transformed observation and the previous observations. The comparison may identify outlier observations, which may indicate events or precursors to events.

The time series database 220 may be any type of database or storage mechanism that may allow storage, retrieval, searching, or other operations to be performed with time series data. The time series data may be any type of data stream that represents multiple observations over time. In a typical use, the time series may contain observations that are gathered at regular time intervals.

A time series intake 222 may collect time series data from various monitored devices and may pass the data to an event tagger 224. The event tagger 224 may tag the incoming data with any events that may be observed. The data may then be stored in the time series database 220.

The event tagger 224 may process incoming data streams and add event information to the data stream. In some cases, the events may be derived by analyzing the data stream and adding event tags to the data. One example of such an event may be when application performance falls below a service level agreement. The event tagger 224 may compare observed performance to a service level agreement and when the service level agreement is not satisfied, an event may be identified and the time series observations may be tagged accordingly.

A search engine 226 may search the time series database 220 in several different scenarios. In one scenario, the search engine 226 may be used in real time or near real time to find matching historical data. These may be used to build predictions for a system that may be executing. In another scenario, the search engine 226 may search for events or time series segments as part of an analysis to build a set of reference time series that may be precursors to various events.

A predictive analysis engine 228 may receive a time series segment from a monitored device 240, then the search engine 226 may retrieve similar segments from historical records. The predictive analysis engine 228 may then build a prediction based on the historical data. An example of such a process is illustrated in embodiment 100.

A reference analyzer 230 may identify precursor time series segments that may be used by a real time analyzer 250 at the monitored devices 240 to detect anomalies or predict events. The events may be searched and analyzed by a reference analyzer 230. One operation of the reference analyzer 230 may be to retrieve several time series that contain a specific event, then determine a characteristic precursor of the event. The precursor may be a time series segment that may precede a particular event and may indicate that the event may occur. These precursor time series segments may be stored in a reference time series database 232.

The precursor time series may be statistically significant indicators of a future event. The reference time series may be transferred to a monitored device 240, which may compare the reference time series segments to currently observed time series. A match may indicate that an event has a statistically significant potential of occurring.

A reference manager 234 may transmit reference time series segments to monitored devices 240 for comparison in real time or near real time. The monitored devices 240 may compare the reference time series segments to new observations to predict various events.

A dimensionality reduction analyzer 236 may analyze a time series of observations to determine a transformation 239 of the data. Dimensionality reduction analysis may be any statistical procedure that uses transformation to convert a set of observations of possibly correlated variables into a set of values of uncorrelated variables sometimes called principal components. The time series observations may include performance and other observations for an application, which may include many tens or even hundreds of observations in each time interval. These observations may be converted to principal components, then have clustering and other analysis performed on the data.

Historical or new data may be transformed by a dimensionality reduction transformation, then used to generate a graph or other diagram. Such diagrams may indicate the mode of operations of an application, and may be useful for developers to view and understand the behavior of their applications. When clustering analysis may be applied to the transformed data, many applications can be visualized as operating in several distinct modes.

The dimensionality reduction transformations may be used as a mechanism to detect anomalies in behavior. After generating a dimensionality reduction transformation from historical data, new data may be transformed and compared to the transformed historical data. When new data are substantially different from the transformed data, the new data may be flagged as an anomaly. Such analyses may be performed in real time or near real time by the monitored devices 240.

A transformation manager 241 may transmit the various transformations 239 to the monitored devices 240. As transformations 239 are updated or created, the transformation manager 241 may update the various monitored devices 240 that may analyze new observations using the transformations.

The monitored devices 240 may operate on a hardware platform 242, which may be similar to the hardware platform 204 of device 202. The hardware platform 242 may be any type of computing device, from large server computers to desktop computer, handheld computers, mobile telephone and tablets, to smaller devices that may perform at least some computation.

An execution platform 244 may be an operating system, virtual machine, process virtual machine, or other framework in which an application 246 may be executed. A tracer 248 may monitor the operations of the application 246 and may collect, observe, or generate various tracer data. The tracer 248 may transmit the data to the time series intake 222 on the device 202 for storage in the time series database 220. In a typical mode of operation, the tracer 248 may collect and transmit data on a periodic basis, thereby creating a time series of tracer information.

A real time analyzer 250 may perform various types of analysis on the data as the data are collected. The real time analyzer 250 may analyze the data by comparing recent observations against one or more reference time series that may be identified as precursors to various events. The real time analyzer 250 may analyze the data by applying dimensionality reduction transformations to the data and testing the transformed data for anomalies.

A reference database 252 may contain reference time series that may be obtained from the reference time series database 232. The reference time series may be actual or generalized time series segments that may have been previously identified as precursors for various events. A real time analyzer 250 may identify that the data collected from the application 246 is similar to a precursor event, in which case the real time analyzer 250 may cause an alarm or other action to be triggered.

The dimensionality reduction transformation 254 may be a transformation function that may transform tracer output. The transformed tracer output may be compared to transformed historical data to determine if the recently observed data are anomalous. When the recently observed data are anomalous, an event or other action may be triggered.

A client device 256 may be one mechanism by which a user may interact with the various components in the data gathering and analysis system. The client device 256 may have a hardware platform 258 on which a browser 260 may execute. The browser may connect with the various components to generate a user interface 262 through which a user may setup, configure, monitor, control, and otherwise interact with the various components. In many cases, the user interface 262 may provide summary statistics and alert information generated in the system.

The example of embodiment 200 illustrates merely one architecture of a system that may collect and analyze tracer data. Some of the various components illustrated may be deployed on separate hardware platforms, and may be embodied on customized circuitry or hardware that may or may not have a software component.

Figure 3:
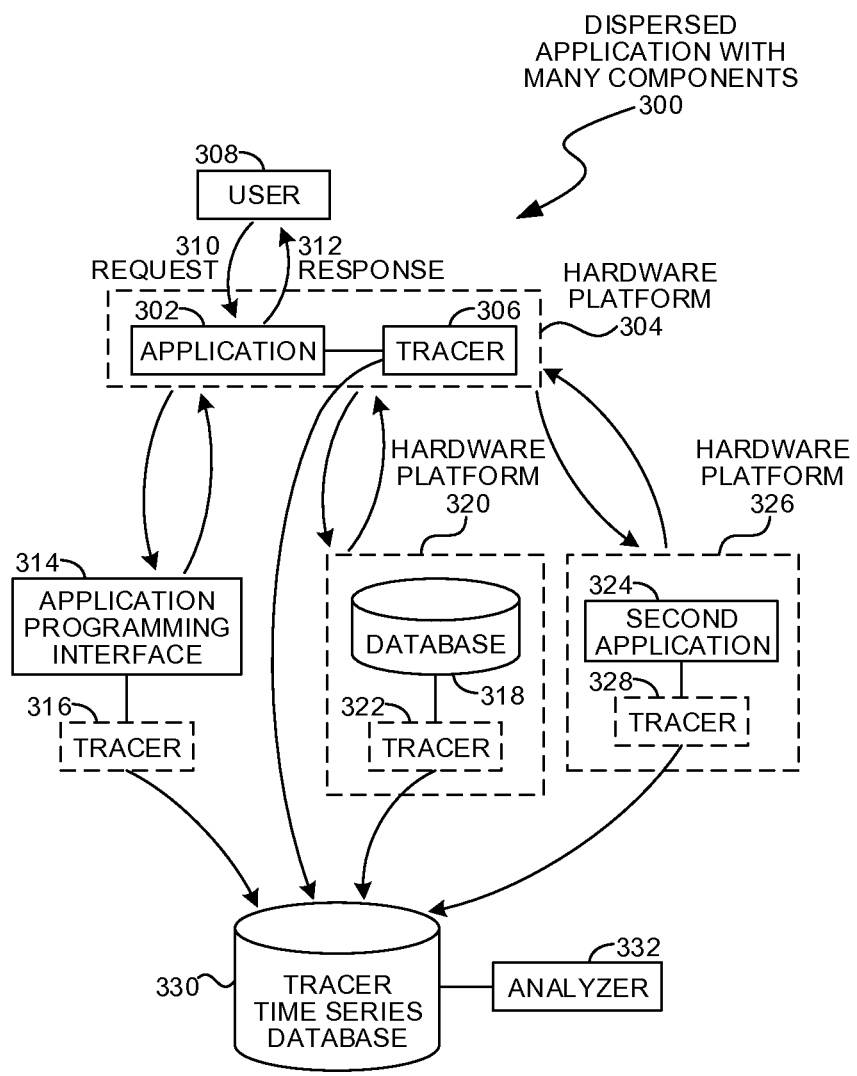
FIG. 3 is a diagram illustration of an embodiment showing a dispersed application with multiple tracing points.

FIG. 3 is a diagram illustration of an embodiment 300 showing a dispersed application with many components. Embodiment 300 is merely one example of a tracer system that may collected data from multiple sources, where each of the sources may be part of a larger application. Such applications may interact with other computer systems, which may have various application programming interfaces, databases, applications, or other components, all of which contribute to a larger application. Embodiment 300 is merely one example of a dispersed application. Other dispersed applications may have different architectures and interact with fewer or additional components.

An application 302 may execute on a hardware platform 304. The application may be a software or hardware function that may have data collected by a tracer 306. The tracer 306 may collect performance and other operational observations of the application 302 and transmit the observations to a time series database 330.

The application 302 may receive requests 310 from a user 308 and return responses 312 to the user 310. The user 310 may be a human user in many cases. In some cases, the user 310 may be another software or hardware application.

The application 302 may interact with an application programming interface 314 of another system. The application programming interface 314 may be a defined protocol for sending and receiving information, and such interfaces may be defined for any type of software or hardware system. In some cases, a tracer 316 may be located on the system of the application programming interface 314. The tracer 316 may collect performance and other observations of the activities associated with the application 302 and may transmit those observations to the tracer time series database 330.

A database 318 may be queried by the application 302. The database 318 may reside on a second hardware platform 320 and may have a tracer 322 that may collect observations and transmit those observations to the tracer time series database 330.

Similarly, a second application 324 may interact with the application 302. The second application 324 may operate on another hardware platform 326 and may have a tracer 328 that may collect observations and transmit those observations to the tracer time series database 330.

Some systems that collect tracer data from multiple sources may have an analyzer 332 which may aggregate the data from each source. The aggregation may create time series data that represents a larger application that includes all of the operations of the application 302, application programming interface 314, database 318, and the second application 326. In some cases, the analyzer 332 may be capable of connecting a transaction between the application 302 and the other components, thereby adding the performance observations of the other components to a transaction initiated by the application 302. In some cases, the analyzer 332 may be able to aggregate the observations from multiple systems without linking transaction or interactions between the various sources.

Figure 4:
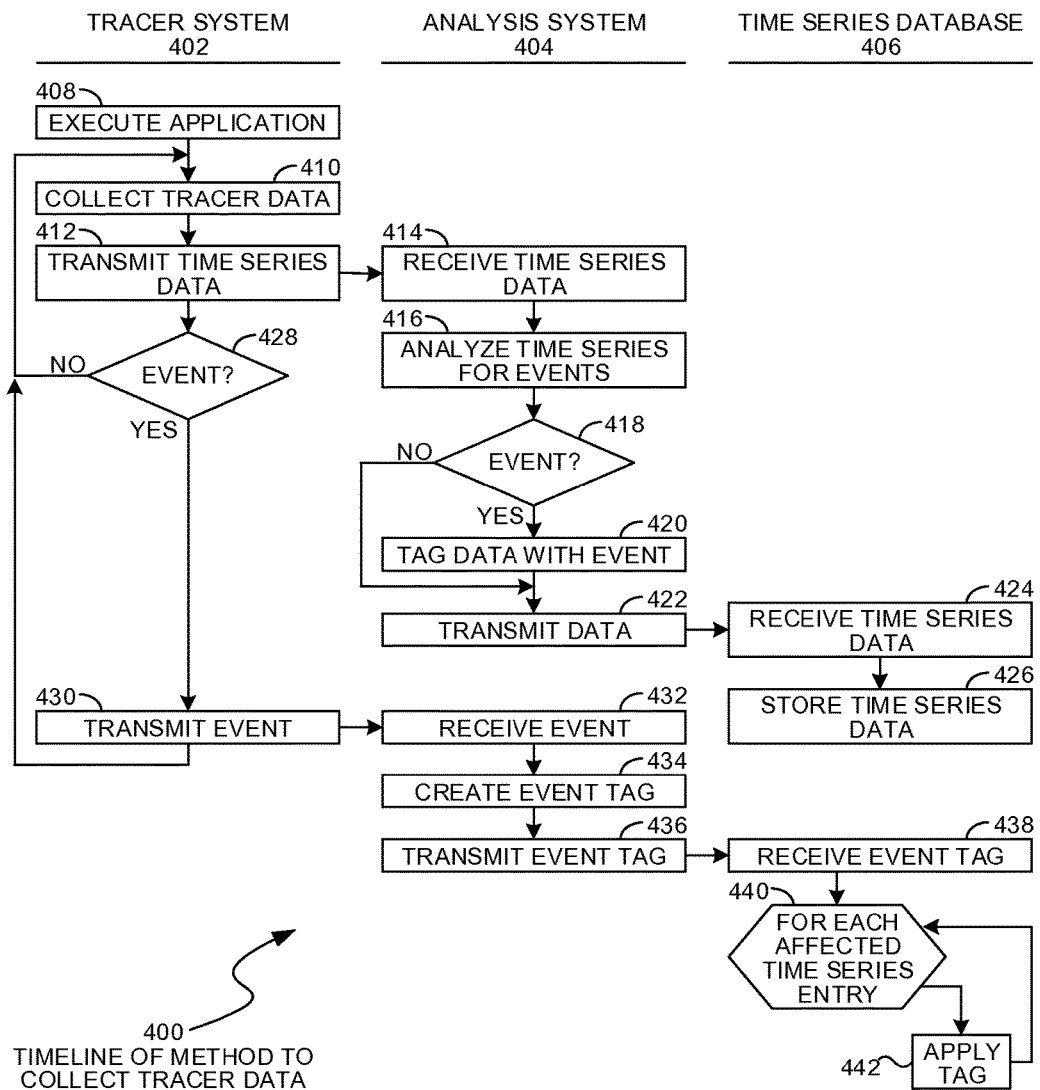
FIG. 4 is a timeline illustration of an embodiment showing a method for collecting tracer data.

FIG. 4 is a timeline illustration of an embodiment 400 showing a method for collecting tracer data. Embodiment 400 may illustrate the operations of a tracer system 402 in the left column, the operations of an analysis system 404 in the center column, and a time series database 406 in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

The tracer system 402 may represent any system for which a tracer may collect and transmit observations. An example of such a system is tracer 248 from embodiment 200 or the various tracers illustrated in embodiment 300.

The analysis system 404 may be a system that receives, preprocesses, and stores the incoming tracer data. An example of such a system may include the time series intake 222 and event tagger 224 of embodiment 200.

The time series database 406 may be the storage mechanism that contains tracer data in time series form. In some systems, the time series database 406 may be located on a remote system and may be accessed as a network service.

The tracer system 402 may execute an application in block 408 and collect tracer data in block 410. On a periodic basis, the tracer system 402 may transmit time series data in block 412 to the analysis system 404, which may receive the time series data in block 414.

The time series data being collected and transmitted may be any observations, metadata, or other information that the tracer may collect and transmit. Because these data may be transmitted on a periodic basis, they may form a time series when stored and accessed in the sequence the observations were collected.

The analysis system 404 may analyzed the time series data for events in block 416. The analysis of block 416 may include analyzing the incoming data for any anomalies. The anomalies may be detected from individual time series data points or through analysis of segments of time series data. Examples of such anomaly detection may include analyzing such data against predefined limits, such as service level agreements. Other examples may be statistical analysis of variances, comparison of data transformed by dimensionality reduction analysis, or other analyses.

When an event is identified in block 418, the data may be tagged with the event in block 420. If no event was detected in block 418, the tagging operation may be skipped. The data may be transmitted in block 422 to the time series database 406, which may receive the time series data in block 424 and may store the data in block 426.

In some cases, the tracer system 402 may detect that an event has occurred. The tracer system 402 may have an alert system that may identify conditions for an event, and when such an event is detected in block 428, the event may be transmitted in block 430 to the analysis system 404.

The event may be received in block 432 by the analysis system 404. A tag may be created for the event in block 434 and transmitted in block 436 to the time series database 406.

The event tag may be received in block 438 by the time series database 406. In many cases, the event tag may define a time period or other conditions that may apply to the event, thereby affecting multiple time series entries. For each of the affected entries in block 440, the event tag may be applied in block 442.

Figure 5:
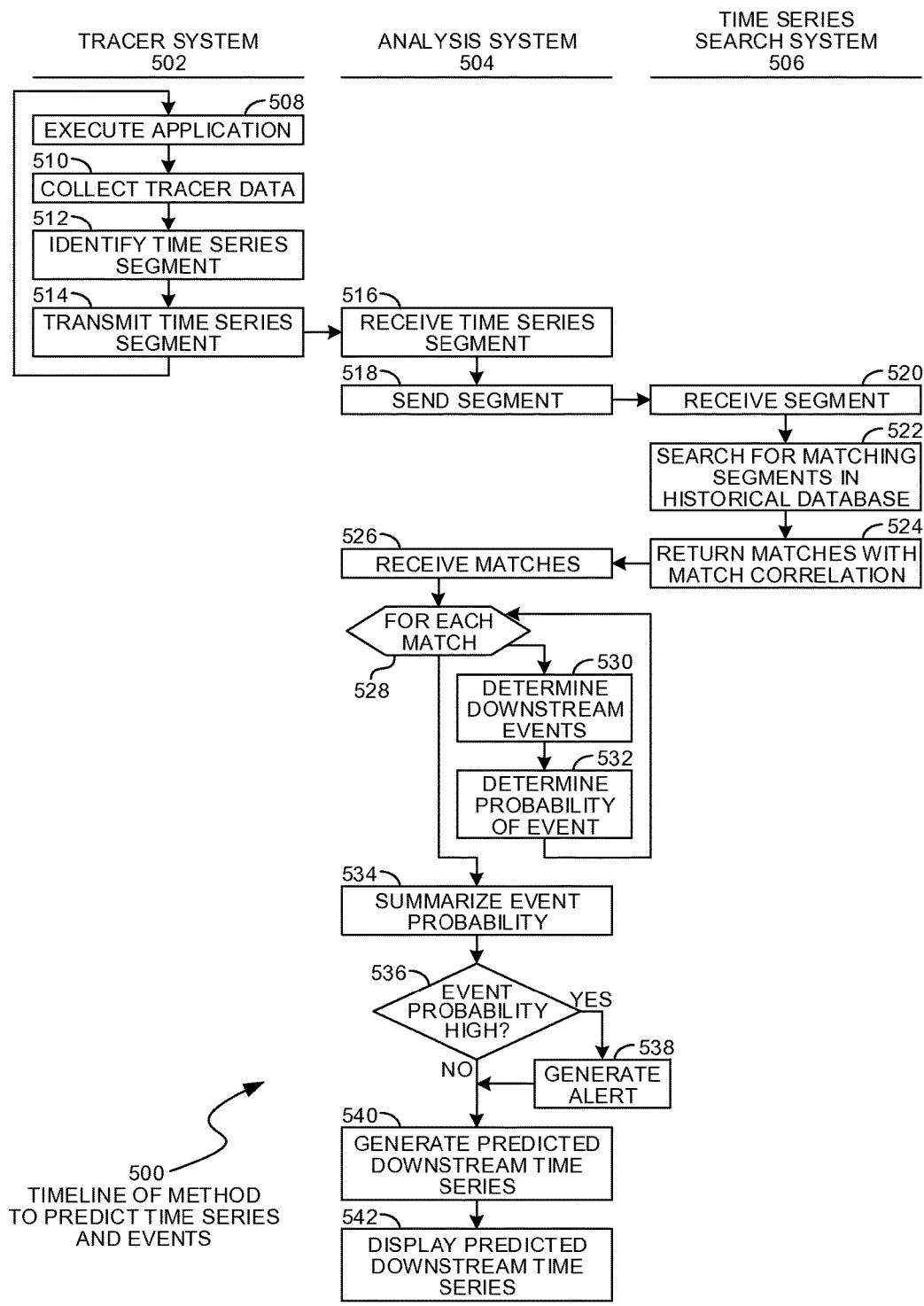
FIG. 5 is a timeline illustration of an embodiment showing a method for predicting time series and events.

FIG. 5 is a timeline illustration of an embodiment 500 showing a method for predicting time series and events. Embodiment 500 may illustrate the operations of a tracer system 502 in the left column, the operations of an analysis system 504 in the center column, and a time series search system 506 in the right hand column.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 500 may illustrate one method for generating predictions based on current time series observations. The method searches for similar time series segments in a time series database, then generates a prediction of future behavior based on the historical observations stored in a time series database.

The tracer system 502 may represent any system for which a tracer may collect and transmit observations. An example of such a system is tracer 248 from embodiment 200 or the various tracers illustrated in embodiment 300.

The analysis system 504 may be a system that analyzes incoming tracer data. An example of such a system may include the predictive analysis engine 228 of embodiment 200.

The time series search system 506 may be a search engine that accesses a time series database, where the time series database contains historical tracer observations. An example of such a system may include the search engine 226 of embodiment 200.

The tracer system 502 may execute an application in block 508. As the application executes, tracer data may be collected in block 510. A time series segment may be identified in block 512 and transmitted to the analysis system 504 in block 514.

The time series segment may be a single data point in a time series or a sequence of data points in the time series. In many cases, each data point in a time series may be a vector of many parameters, sometimes as many as 50, 100, or more parameters.

The time series segment may be received in block 516 by the analysis system 504. The segment may be transmitted in block 518 to the time series search system 506, which may receive the segment in block 520.

A search for matching segments may be made in block 522. The matches may be returned in block 524. The matching segments may be taken from any data in the historical database. In some cases, the matching segments may be taken from previous observations of the same application with the same hardware and software configuration as the tracer system 502. In other cases, the matching segments may be from similar or dissimilar systems that may have executed similar or dissimilar applications.

The matching time series segments may be received by the analysis system 504 in block 526. For each match in block 528, any downstream events from the matching segment may be identified in block 530. A probability of the event may be estimated in block 532.

The analysis of blocks 530 and 532 may examine the historical data that were observed at some time after the matching segment. By looking downstream or after a match and finding an event, a prediction may be made that an event may occur. The probability of the event may be affected by the degree of similarity of the match, as well as other factors. In some cases, a heuristic or other mechanism may be used to estimate a probability.

The event probability may be estimated in block 534. In some cases, such a probability may be estimated as an aggregation of the probabilities determined in block 532.

When the probability of the event is high in block 536, an alert may be generated in block 538. The alert may be logged, transmitted to an administrator or other interested party, or trigger some other action.

A predicted downstream time series may be generated in block 540, whether or not an event was predicted. The predicted time series may be an aggregation of the downstream historical time series. In many cases, the contribution of each historical time series may be weighted by the match similarity or other factor to generate a predicted time series.

The predicted downstream time series may be displayed in block 542.

Figure 6:
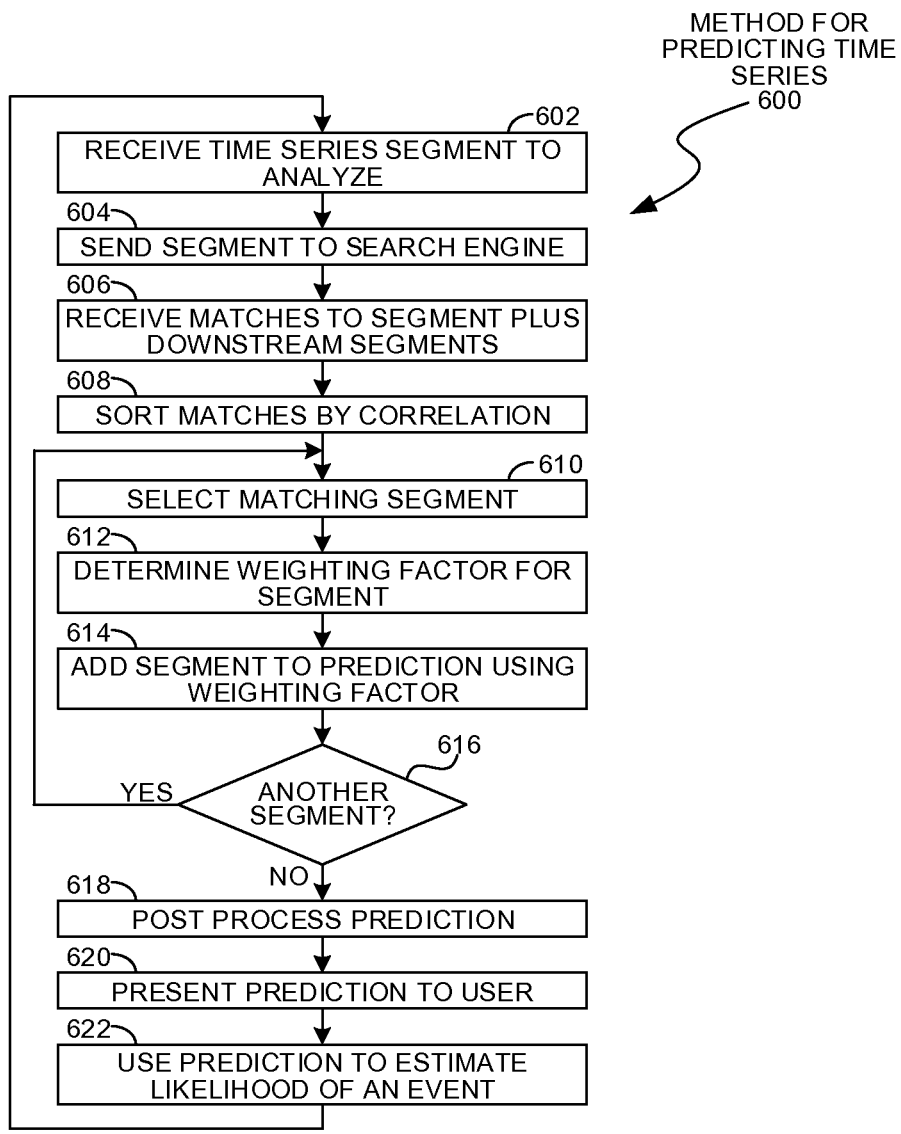
FIG. 6 is a flowchart illustration of an embodiment showing a method for predicting time series.

FIG. 6 is a flowchart illustration of an embodiment 600 showing a method for predicting time series. Embodiment 600 may illustrate a more detailed example of the operations that may be performed by the analysis system 504 of embodiment 500.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

A time series segment may be received in block 602 for analysis. The segment may be sent to a search engine in block 604, which may search a time series database that contains previously observed time series. Matches to the time series segment, along with the downstream segments from the match, may be received by the search engine in block 606.

The matches may be sorted by the correlation between the original time series segment and the segments found in the database in block 608. The segment with the strongest correlation may be selected in block 610.

A weighting factor for the segment may be determined in block 612. The weighting factor may be derived in part from a calculated correlation coefficient, and may also include factors based on heuristics that may take into account similarities in hardware, software, or operational characteristics of the various time series. The weighting factor may be applied to the segment and the weighted segment may be added to a prediction in block 614. When an additional segment is available in block 616, the process may return to block 610 to analyze the additional segment.

The prediction may be post processed in block 618. The post processing may be any further analysis, smoothing, or other operations that may be performed before presenting the prediction to a user in block 620. The prediction may be used in block 622 to predict the likelihood of an event.

Figure 7:
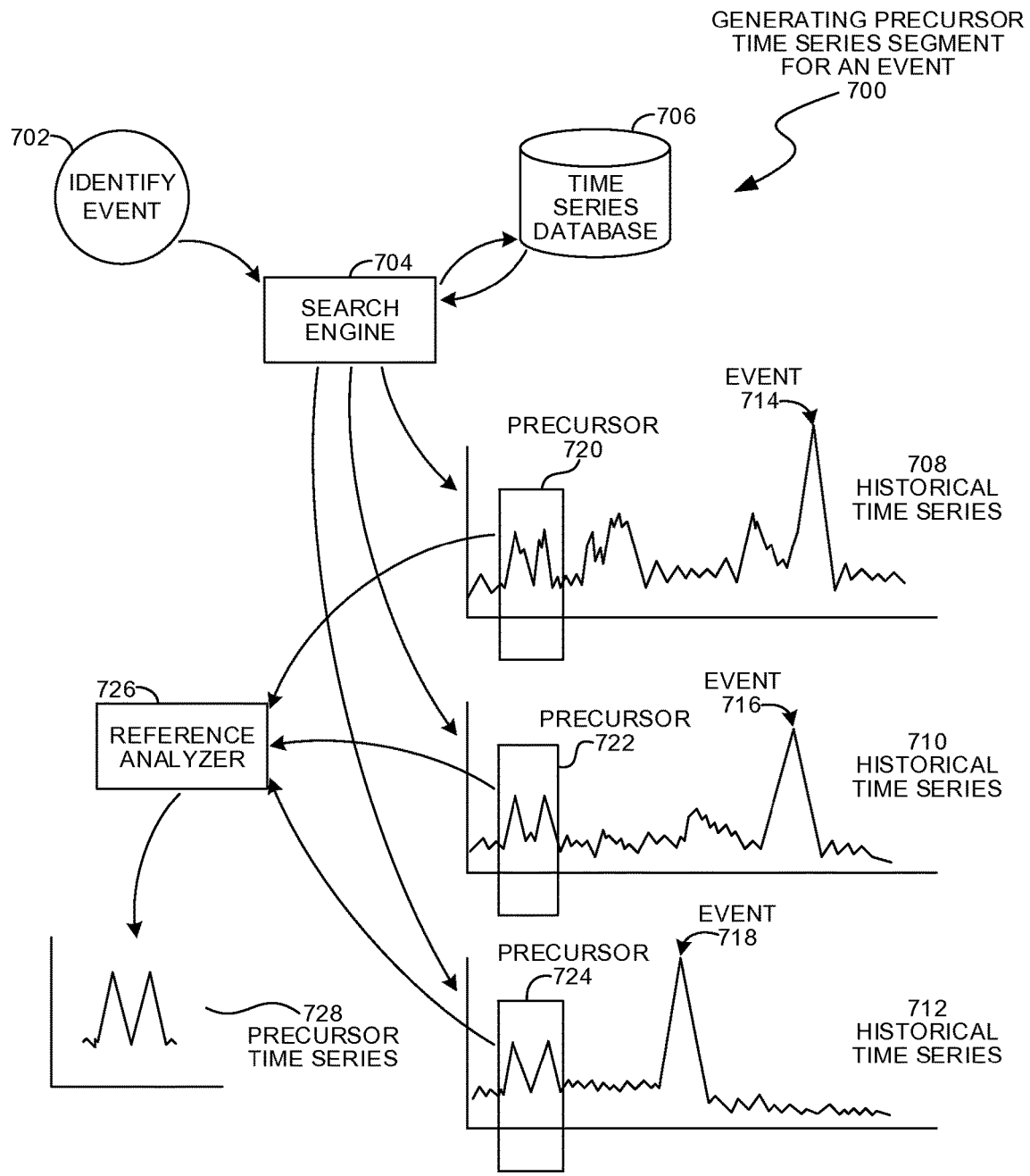
FIG. 7 is a diagram illustration of an embodiment showing a method for generating precursor time series segments for a given event.

FIG. 7 is a diagram illustration of an embodiment 700 showing a method for generating a precursor time series segment for a given event. Embodiment 700 shows a sequence that may be performed at least in part by a reference analyzer, such as the reference analyzer 230 of embodiment 200.

Embodiment 700 illustrates a method by which historical time series may be analyzed to find a precursor time series segment that may indicate a future event with some statistical probability. The precursor time series may be used to predict the event.

An event may be identified in block 702. The event may be defined as a condition or other descriptor that may be searched by a search engine 704. In some cases, events may be tagged in the data stored in the time series database 706. In other cases, the event may be a time series segment where an event occurred. In still other cases, an event may be defined in some other manner.

The search engine 704 may return multiple historical time series 708, 710, and 712, each of which contained an instance of an event 714, 716, and 718, respectively.

A reference analyzer 726 may analyze the various historical time series to identify precursors 720, 722, and 724 which may be statistically significant time series segments that may indicate the likely event. These time series segments may be combined into a precursor time series 728. The precursor time series 728 may be compared to a currently observed time series segment and when there is a match, the event may be predicted.

Figure 8:
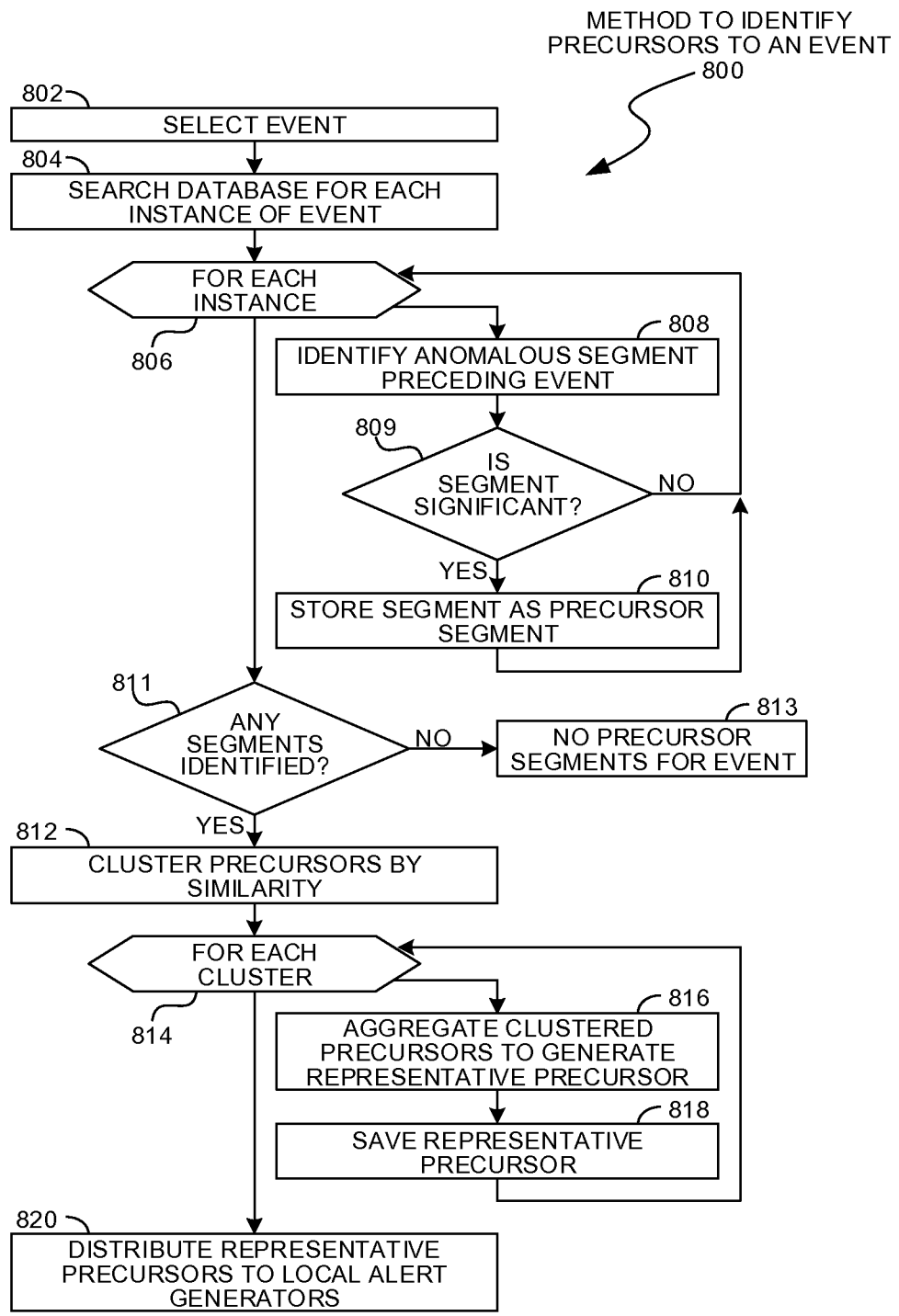
FIG. 8 is a flowchart illustration of an embodiment showing a method for identifying precursors of an event.

FIG. 8 is a flowchart illustration of an embodiment 800 showing a method for identifying precursor time series segments for a given event. Embodiment 800 may illustrate a more detailed example of the operations that may be performed in embodiment 700.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 800 illustrates one method for defining a precursor time series segment for an event. The precursor may be a time series segment that, when identified in a current time series, may indicate that an associated event may occur.

An event may be selected in block 802. A time series database may be searched in block 804 for each instance of the event.

The event may be defined in any manner that may be accepted by a search engine. In some cases, an event may be a time series segment that was automatically or manually identified as an 'event'. In other cases, an event may be a tagged event that may be stored in metadata or other annotations within the time series database.

Each instance of the event may be analyzed in block 806. For each instance, an anomalous segment preceding the event may be identified in block 808. When the anomalous segment can be a significant indicator of the event in block 809, the segment may be stored as a precursor segment in block 810. When the anomalous segment is not a significant indicator of the event in block 809, the process may return to block 806 to process the next instance.

The anomalous segment preceding an event may be identified by searching for segments preceding the event and testing those segments for uniqueness. The uniqueness may be defined by searching for the segment in the database to determine how common the segment may be. Those segments that are highly unique and precede an event may be more statistically likely to indicate that the event may occur.

After analyzing each instance in block 806, if no statistically significant precursors have been identified in block 811, the process may end with no precursor event identified for the event in block 813.

As long as one or more precursors have been identified in block 811, the precursors identified for the event may be clustered by similarity in block 812. Each cluster of similar precursors may be analyzed in block 814.

For each cluster of similar precursors in block 814, the clustered precursors may be aggregated in block 816 to generate a representative precursor for the cluster. The representative precursor may be saved in block 818.

After processing each group or cluster of precursors, the representative precursors may be distributed to various alert generators in block 820. In many cases, the alert generators may be operating on the same device as a tracer.

Figure 9:
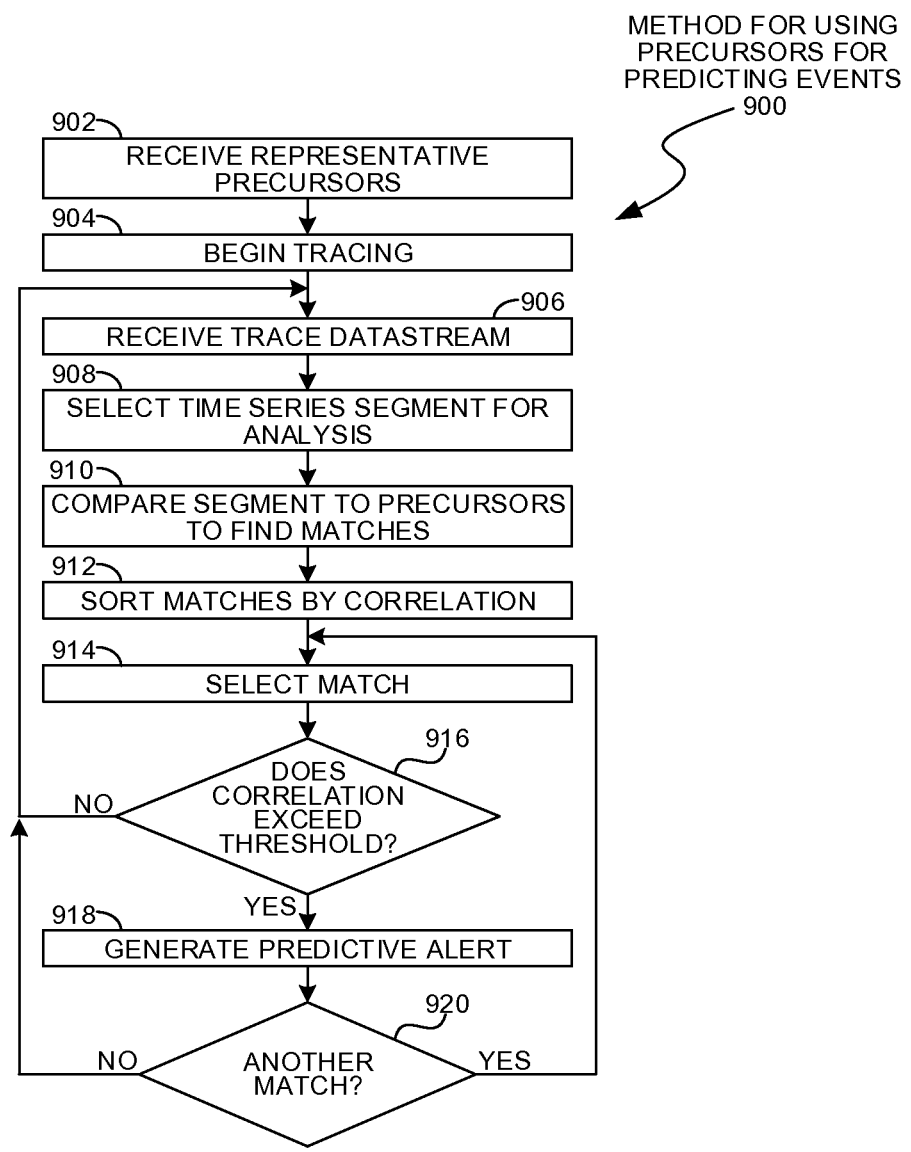
FIG. 9 is a flowchart illustration of an embodiment showing a method for using precursors to predict events.

FIG. 9 is a flowchart illustration of an embodiment 900 showing a method for using precursors to predict an event. Embodiment 900 may illustrate the operations of a real time analyzer that may be deployed with a tracer, similar to the real time analyzer 250 of embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 900 illustrates one method by which precursor time series segments may be used to predict an event.

Representative precursors may be received in block 902. The representative precursors may be a series of data points that may be determined from a method such as embodiment 800 and may represent statistically significant indicators that an event may occur in the future.

Tracing may begin in block 904 and a trace data stream may be received in block 906. A time series segment may be selected in block 908 for analysis. The time series segment may be a set of recent time series observations from a tracer.

A comparison may be made in block 910 to compare the currently observed time series to the various precursor time series segments. When multiple matches are found in block 910, the matches may be sorted by correlation in block 912.

The match with the highest correlation may be selected in block 914. If the correlation exceeds a predefined threshold in block 916, a predictive alert may be generated in block 918. If another match is available, the process may return to block 914.

When the correlation does not meet the predefined threshold in block 916, the process may return to block 906 to analyze the next time series segment. Similarly, if no more matches are available for analysis in block 920, the process may return to block 906.

Figure 10:
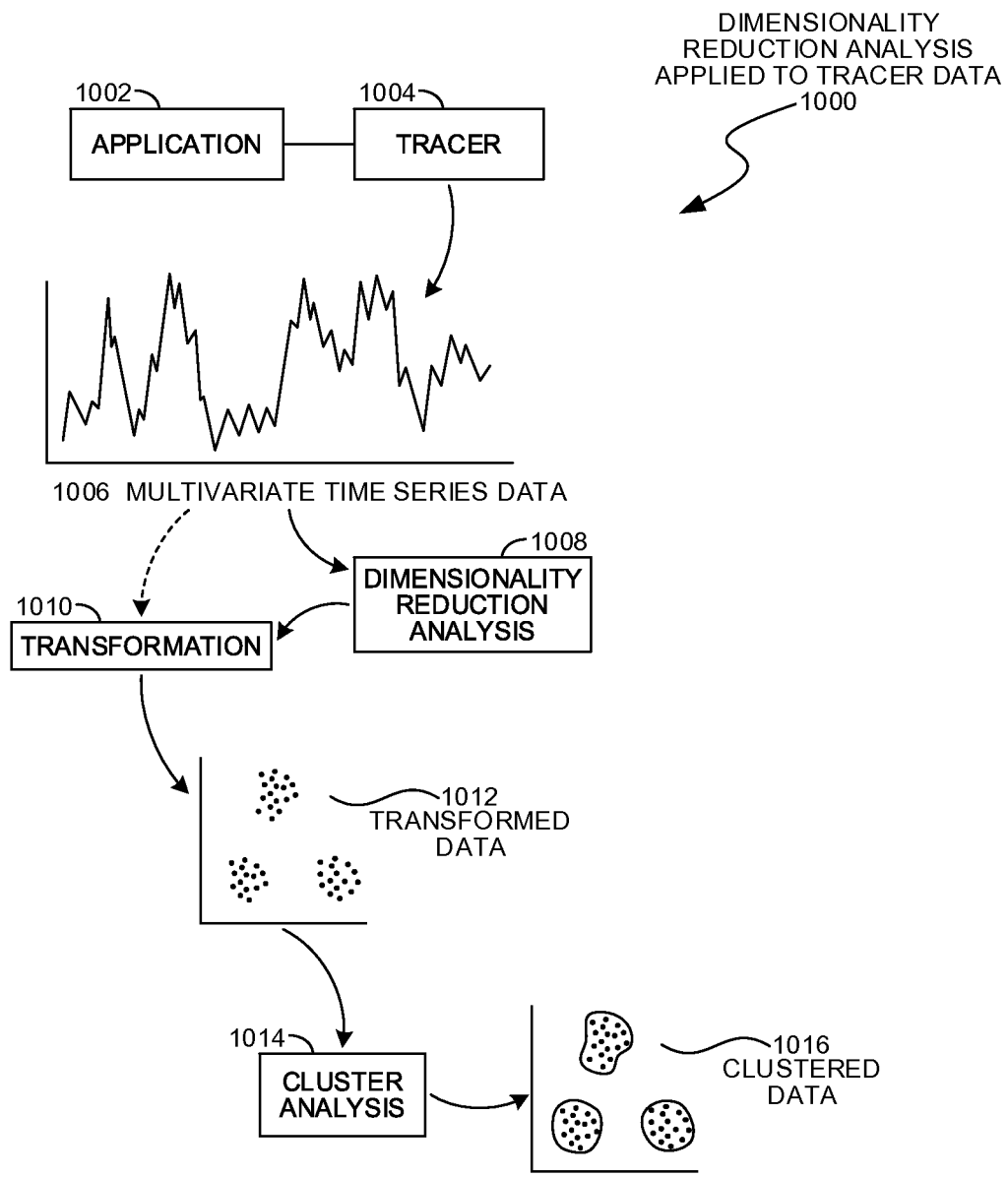
FIG. 10 is a diagram illustration of an embodiment showing a method for principal component analysis of tracer data.

FIG. 10 is a diagram illustration of an embodiment 1000 showing dimensionality reduction analysis applied to tracer data. Dimensionality reduction analysis may represent any of several mathematical methods to perform dimensional reduction transformation on a set of observations. In many cases, tracer data may include performance and other metrics, which may include a vector of many parameters at each data point. Some cases may have 10, 20, 50, 100, or more parameters collected at east period of the time series.

Dimensionality reduction analysis of these data may produce useful graphs and analysis of the performance of an application. Once transformed using dimensionality reduction analysis, the tracing data may undergo cluster analysis to identify the modes in which the application may behave.

The dimensionality reduction transformation and cluster analysis may be used as a mathematical model of the application behavior. As such, new observations of the application's behavior may be tested against the model to determine if the behavior is uncharacteristic or anomalous. When the behavior is anomalous, an alert may be created or another action may be taken.

An application 1002 may be executed with a tracer 1004. The tracer 1004 may collect performance and other operational observations about the application 1002, and the output of the tracer 1004 may be a multivariate time series 1006.

A dimensionality reduction analysis 1008 of the time series data may generate a transformation 1010. The transformation 1010 may be applied to the multivariate time series 1006 to generate transformed data 1012. The transformed data 1012 may be presented in a two dimensional graph that only displays the top two dimensions of the primary component analysis.

In many cases, the dimensionality reduction analysis of an application's trace data may show distinct groups. The groups may reflect the modes of operation of the application. A cluster analysis 1014 may result in clustered data 1016.

Figure 11:
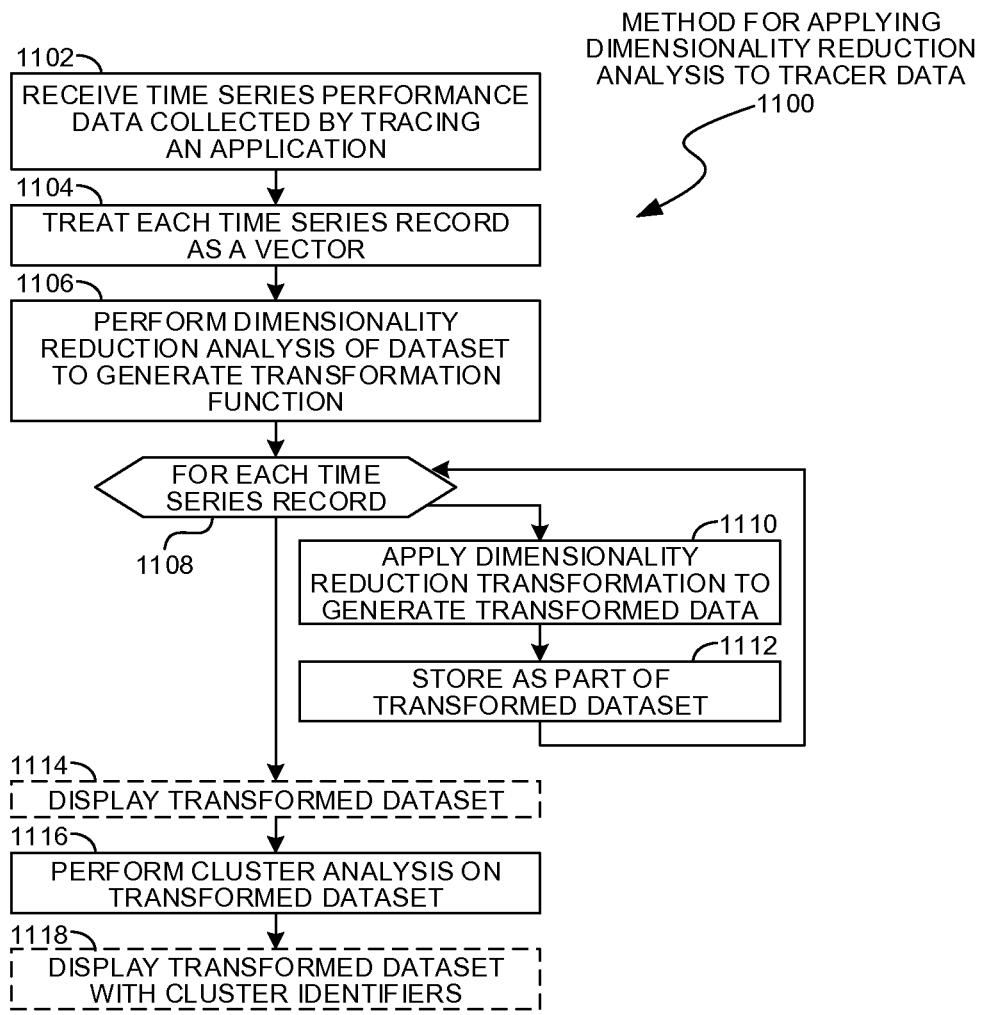
FIG. 11 is a flowchart illustration of an embodiment showing a method for applying principal component analysis to tracer data.

FIG. 11 is a flowchart illustration of an embodiment 1100 showing a method for applying dimensionality reduction analysis for tracer data. Embodiment 1100 may illustrate the operations of a dimensionality reduction analyzer, such as the dimensionality reduction analyzer 236 of embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

Embodiment 1100 illustrates one method for creating and applying dimensionality reduction analysis to tracer data. A transformation may be created by analyzing a time series of tracer data, then the transformation may be applied to the time series data points creating a transformed data set. The transformed data set may be presented as a two or three dimensional graph, and also may have clustering analysis applied.

A time series of performance data collected by a tracer may be received in block 1102. Each time series record may be treated as a multi-dimensional vector in block 1104, and a dimensionality reduction analysis may be performed in block 1106 to generate a transformation.

Each time series record may be analyzed in block 1108, and the dimensionality reduction transformation may be applied to the record in block 1110 and stored in block 1112 as part of a transformed data set.

The transformed dataset may be displayed in block 1114 in some cases.

Cluster analysis may be performed in block 1116 on the transformed data set. The transformed data set may be displayed in block 1118 with cluster identifiers.

Figure 12:
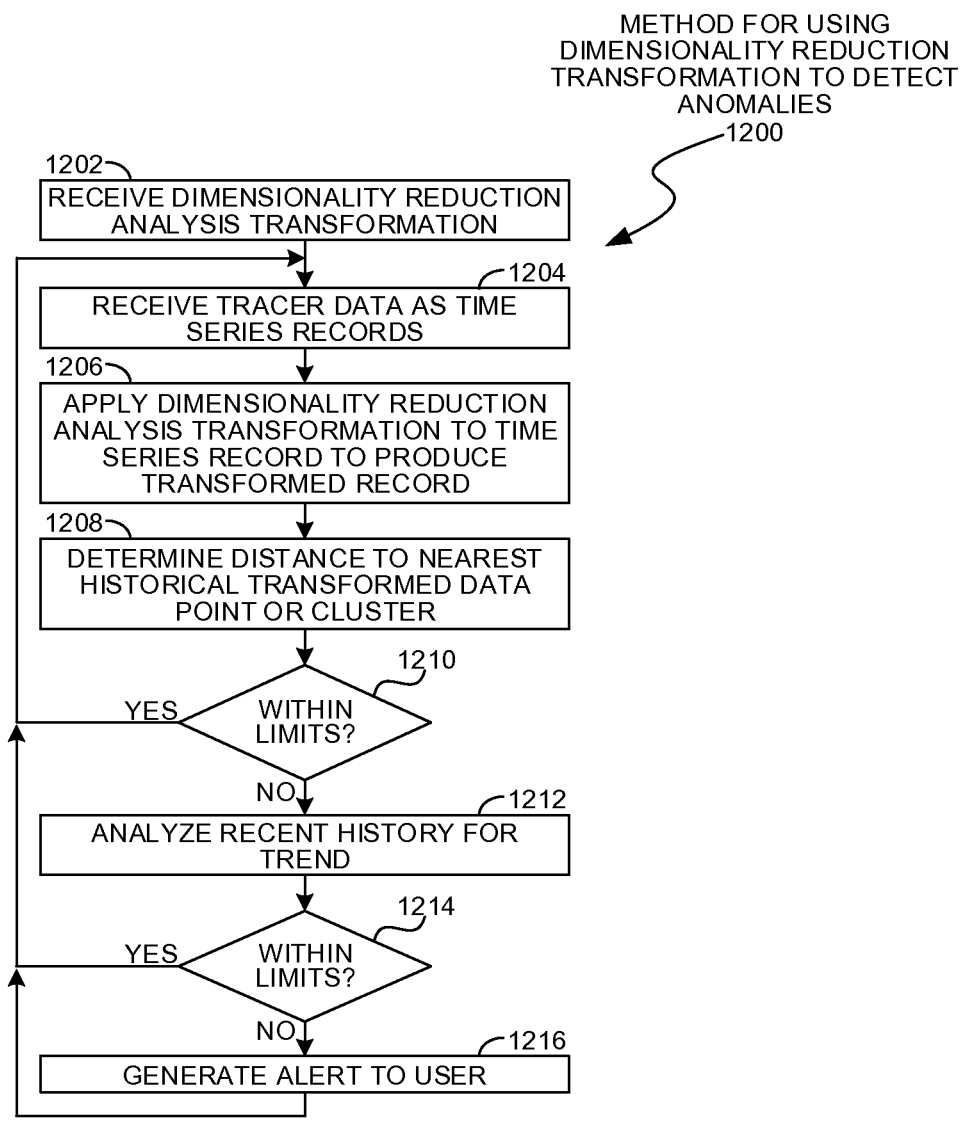
FIG. 12 is a flowchart illustration of an embodiment showing a method for using principal component analysis to detect anomalies and outliers.

FIG. 12 is a flowchart illustration of an embodiment 1200 showing a method for using dimensionality reduction analysis transformations when identifying performance anomalies for an application. Embodiment 1200 may illustrate the operations of a real time analyzer that may be deployed with a tracer, similar to the real time analyzer 250 of embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principals of operations in a simplified form.

A dimensionality reduction analysis transformation may be received in block 1202. The transformation may be in the form of an equation or other mathematical transformation.

Tracer data may be received in block 1204. The tracer data may be time series records that may be recently observed. The records may be transformed in block 1206 to produce a transformed record.

The transformed record may be a vector that may be compared to previously observed data points. The distance between the current data and the historical data may be calculated in block 1208, for example using cosine similarity or other calculation. When the distance is relatively small, the currently observed data point may be similar to historical data, but when the distance is relatively large, the currently observed data point may be considered be an anomaly.

The distance may be compared to a set of predefined limits in block 1210. When the distance is within the limits, the process may return to block 1204 to analyze the next time series data points.

The distance may be compared to the nearest data point in the historical record, or may be performed against the cluster definitions derived from the historical data. When the distance is measured using the cluster definitions, a statistical test may be performed to determine whether the data point may be a member of any of the previously observed groups of data points.

When the distance is outside the limits in block 1210, the recent history of observations may be analyzed in block 1212 for a trend of anomalous behavior. When the trend is within predefined limits in block 1214, the process may return to block 1204 to analyze the next time series data points. When the trend is outside the predefined limits in block 1214, an alert may be generated in block 1216.

Embodiment 1200 illustrates a method for analyzing currently observed tracer data. Such a method may be applied to predicted time series, such as the time series predictions illustrated in embodiment 100, for example. In such a method, a predicted time series may be created through analysis of previous time series and estimating the time series that may occur. The predicted time series may be analyzed using a dimensionality reduction analysis transformation and compared to other data points or clusters as defined in embodiment 1200.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principals of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed on at least one computer processor, said method comprising:
   generating a dimensionality reduction transformation representing a first time series collected from tracing a computer application, said first time series comprising performance data for a plurality of functions at each observation of said first time series, each of said plurality of functions being part of said computer application;
   applying said dimensionality reduction transformation to a previously observed time series to generate transformed historical data;
   receiving a current time series dataset and applying said dimensionality reduction transformation to generate a transformed current time series dataset;
   comparing said transformed current time series dataset to said transformed historical data to identify an anomalous observation from said transformed current time series dataset; and
   generating an alert based on said anomalous observation, said alert triggering said at least one computer processor to cause a corrective action to be taken to correct said anomalous observation.

2. The method of claim 1 further comprising:
   performing a cluster analysis on said transformed historical data to generate cluster definitions within said transformed historical data.

3. The method of claim 2, said comparing said transformed current time series dataset comprising determining that a first observation in said transformed current time series dataset is an outlier with respect to said cluster definitions.

4. The method of claim 1 further comprising:
   determining a predicted time series observation;
   generating a predicted transformed observation by applying said dimensionality reduction transformation to said predicted time series observation; and
   comparing said predicted transformed observation to said transformed historical data to identify a predicted outlier.

5. The method of claim 4, wherein said alert comprises a first alert, the method further comprising generating a second alert based on said predicted transformed observation, said second alert triggering said at least one computer processor to cause a corrective action to be taken prior to occurrence of said predicted outlier.

6. The method of claim 4, said predicted time series observation being made by analyzing time series having at least one similar time series segment.

7. A system comprising:
   a processor;
   a memory; and
   an analyzer operating on said processor and said memory, said analyzer that:
      receives a dimensionality reduction transformation representing a first time series collected from tracing a computer application, said first time series comprising performance data for a plurality of functions at each observation of said first time series, each of said plurality of functions being part of said computer application;
      applies said dimensionality reduction transformation to a previously observed time series to generate transformed historical data;
      receives a current time series dataset and applying said dimensionality reduction transformation to generate a transformed current time series dataset;
      compares said transformed current time series dataset to said transformed historical data to identify an anomalous observation from said transformed current time series dataset; and
      generates an alert based on said anomalous observation, said alert triggering said system to cause a corrective action to be taken to correct said anomalous observation.

8. The system of claim 7, said analyzer that further:
   receives cluster definitions within said transformed historical data.

9. The system of claim 8, said analyzer that further:
   determines that said transformed current time series dataset comprising determining that a first observation in said transformed current time series dataset is an outlier with respect to said cluster definitions.

10. The system of claim 7, said analysis engine that further:
    determines a predicted time series observation;
    generates a predicted transformed observation by applying said dimensionality reduction transformation to said predicted time series observation; and
    compares said predicted transformed observation to said transformed historical data to identify a predicted outlier.

11. The system of claim 10, wherein said alert comprises a first alert, said analysis engine that further generates a second alert based on said predicted transformed observation, said second alert triggering said system to cause a corrective action to be taken prior to occurrence of said predicted outlier.

12. The system of claim 10, said predicted time series observation being made by analyzing time series having at least one similar time series segment.

13. One or more hardware storage devices having stored thereon instructions that are executable by at least one processor to perform at least the following:
    receive a dimensionality reduction transformation representing a first time series collected from tracing a computer application, said first time series comprising performance data for a plurality of functions at each observation of said first time series, each of said plurality of functions being part of said computer application;

apply said dimensionality reduction transformation to a previously observed time series to generate transformed historical data;

receive a current time series dataset and applying said dimensionality reduction transformation to generate a transformed current time series dataset;

compare said transformed current time series dataset to said transformed historical data to identify an anomalous observation from said transformed current time series dataset; and generate an alert based on said anomalous observation, said alert triggering said at least one processor to cause a corrective action to be taken to correct said anomalous observation.

14. The one or more hardware storage devices of claim 13, the instructions also executable by said at least one processor to receive cluster definitions within said transformed historical data.

15. The one or more hardware storage devices of claim 14, the instructions also executable by said at least one processor to determine that said transformed current time series dataset comprising determining that a first observation in said transformed current time series dataset is an outlier with respect to said cluster definitions.

16. The one or more hardware storage devices of claim 13, the instructions also executable by said at least one processor to:
    determine a predicted time series observation;
    generate a predicted transformed observation by applying said dimensionality reduction transformation to said predicted time series observation; and
    compare said predicted transformed observation to said transformed historical data to identify a predicted outlier.

17. The one or more hardware storage devices of claim 16, wherein said alert comprises a first alert, the instructions also executable by said at least one processor to generate a second alert based on said predicted transformed observation, said second alert triggering said at least one processor to cause a corrective action to be taken prior to occurrence of said predicted outlier.

18. The one or more hardware storage devices of claim 16, said predicted time series observation being made by analyzing time series having at least one similar time series segment.

* * * * *